F. L. BERG.
WHEEL TIRE.
APPLICATION FILED SEPT. 30, 1907.
941,058.
Patented Nov. 23, 1909.
2 SHEETS—SHEET 1.
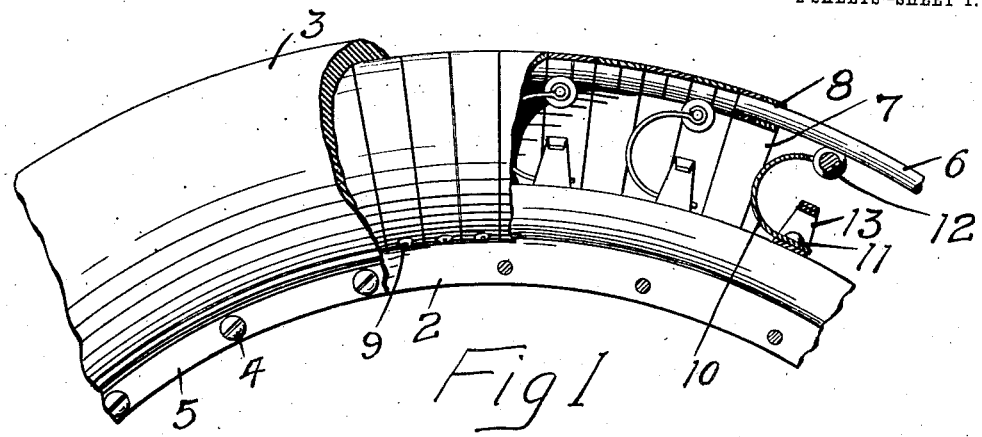
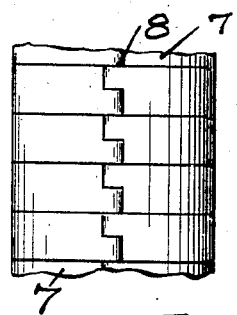
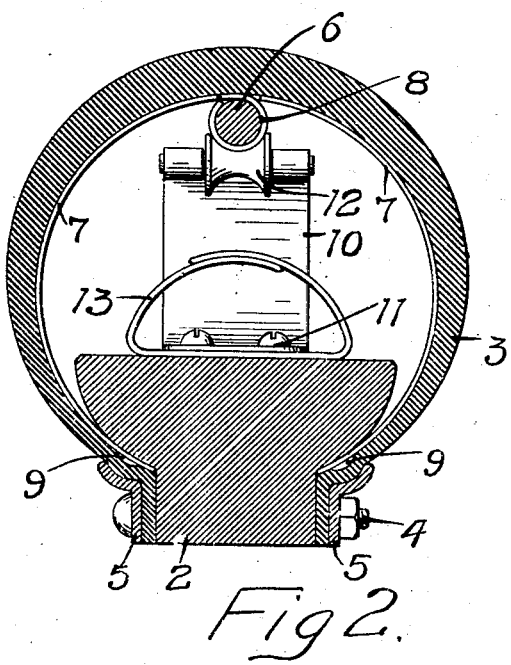
WITNESSES
INVENTOR
FRANK L. BERG
BY
HIS ATTORNEYS

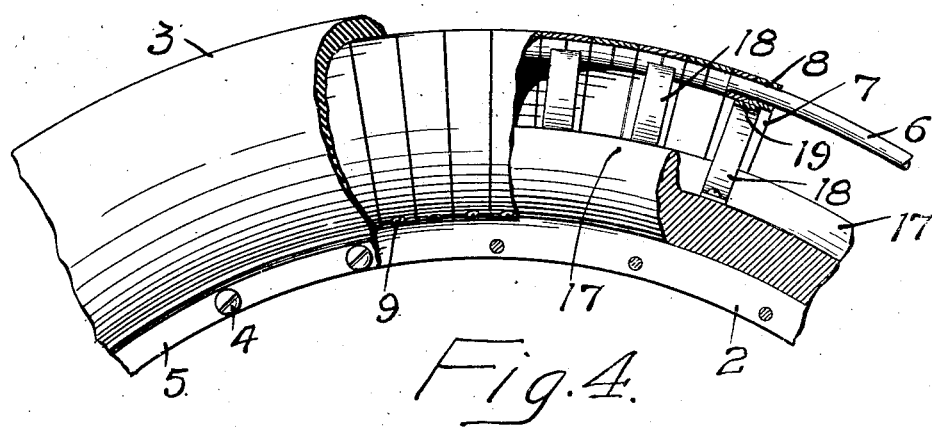
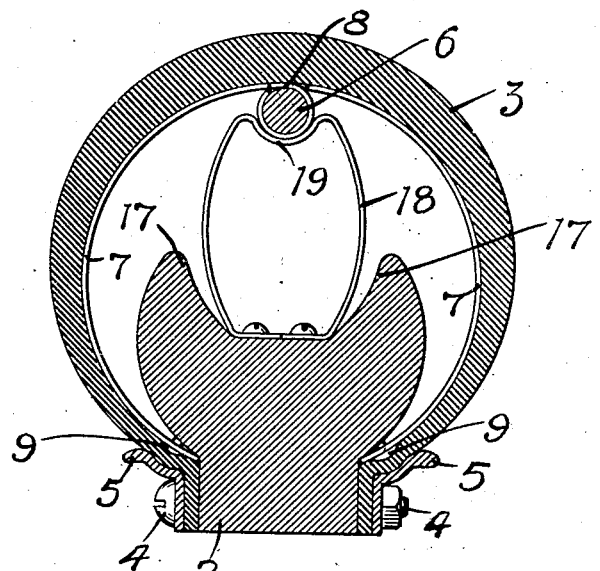

UNITED STATES PATENT OFFICE.

FRANK L. BERG, OF OWATONNA, MINNESOTA.

WHEEL-TIRE.

941,058.     Specification of Letters Patent.     Patented Nov. 23, 1909.

Application filed September 30, 1907. Serial No. 395,118.

*To all whom it may concern:*

Be it known that I, FRANK L. BERG, of Owatonna, Steele county, Minnesota, have invented certain new and useful Improvements in Wheel-Tires, of which the following is a specification.

My invention relates to tires for vehicle wheels and particularly for automobiles, and the object of the invention is to provide a tire of simple construction and one that can be easily repaired when broken or damaged.

The invention consists generally in various constructions and combinations, all as hereinafter described and particularly pointed out in the claims.

In the accompanying drawings forming part of this specification, Figure 1 is a detail view partially in section, of a portion of a rim and tire embodying my invention. Fig. 2 is a transverse sectional view of the same. Fig. 3 is a detail view illustrating the manner of hinging the supporting spring plates on the hoop or ring. Figs. 4 and 5 are detail views, illustrating a modified construction.

In the drawing, 2 represents a wheel rim and 3 a casing or cover arranged to inclose the rim and having its edges secured thereto by bolts 4 and flanged plates 5. This manner of securing the casing on the rim may be modified in various ways and I do not wish to confine myself to any particular construction.

6 is a hoop or ring, preferably of steel, inclosing the rim within the casing 3 and held in its proper position with respect to the rim and casing by means of a series of curved spring plates 7 which are hinged at 8 on the hoop 6 and tapered slightly toward the ends from the middle portion, and are secured to the rim at said ends by screws 9 which are inserted through the plates and into the rim, and are covered by the casing when it is put in place. These plates are sufficiently stiff to support the hoop and the casing and prevent them from being unduly pressed out of position by an ordinary load. The spring plates will yield sufficiently, however, to counteract the jar or jolt arising from the passage of the wheel over rough roads, and in that respect serve as a substitute for a pneumatic tire, without danger of puncture and the resulting annoyance arising from the use of a pneumatic tire.

As indicated in Fig. 2 the springs are curved to fit the inner surface of the casing and support it at all points. As a further support for the hoop I provide a series of springs 10, semi-circular in form, secured at 11 to the rim of the wheel and carrying hollow faced anti-friction rollers 12 that are adapted to bear on the hoop and force it outwardly with a yielding pressure. These springs 10 will resist compression of the hoop, and springs 13 are provided beneath the rollers 12 and have ends which lap by one another in position to be engaged by the said rollers when the wheel is subjected to a heavy load. The inner ends of the springs are bent at an angle to their outer portions and secured to the flat face of the rim 2. These springs may be made of different weight according to the size of the wheel and the character of the load to be supported thereby. The outer casing which may be of rubber, canvas, leather or any other suitable material is readily removable from the rim by taking out the bolts 4 and detaching the angle plates 5.

In Figs. 4 and 5 I have illustrated another modification which consists in providing a rim with a recess having flaring side walls 17. The springs 18 have their ends secured to the rim in the bottom of the recess therein and are curved upwardly and outwardly therefrom, the top of each spring having a downwardly curved seat 19 formed therein to receive the hoop 6. When the tire is subjected to lateral strain, as in turning a corner at high speed the hoop 6 cannot become separated from the seat 19, and one side of the spring 18 will come in contact with the contiguous flaring wall 17 and the spring 7 on the opposite side of the tire contact with the curved outer surface of the rim, thereby bracing the springs and relieving them of a considerable portion of the strain. When the compression on the hoop is vertical the spring 18 will expand and contact with the curved side walls 17 of the rim and be supported thereby.

I claim as my invention:

1. The combination, with a wheel rim, of a hoop encircling the same, a series of flat spring plates secured to said rim at one end and hinged at their opposite ends on said hoop, supplementary springs secured to said rim and having an anti-friction bearing on said hoop, and a covering inclosing said hoop and springs.

2. The combination, with a wheel rim, of a hoop encircling the same, means yieldingly connecting said hoop with said rim, supplementary springs secured to said rim and having an anti-friction bearing on said hoop, and spring devices interposed between the outer ends of said supplementary springs and said rim, substantially as described.

3. A wheel comprising a rim, a hoop circular in cross section encircling said rim and spaced therefrom, springs hinged on said hoop and arranged close together to form a continuous yielding surface around the wheel, said springs being secured to said rim, yielding means secured to said rim and having a bearing on said hoop, and a casing inclosing said hoop and springs.

In witness whereof, I have hereunto set my hand this 27th day of September 1907.

FRANK L. BERG.

Witnesses:
S. T. LITTLETON,
H. E. JOHNSON.